United States Patent [19]

Blumer

[11] Patent Number: 5,287,195
[45] Date of Patent: Feb. 15, 1994

[54] IMAGE DISPLAY APPARATUS AND METHOD USING HALFTONE SUPER CELLS

[75] Inventor: Thomas P. Blumer, Cambridge, Mass.

[73] Assignee: Phoenix Technologies Ltd., Norwood, Mass.

[21] Appl. No.: 983,241

[22] Filed: Nov. 30, 1992

Related U.S. Application Data

[63] Continuation of Ser. No. 583,445, Sep. 12, 1990, abandoned.

[51] Int. Cl.⁵ .................. H04N 1/21; H04N 1/46; H04N 1/40
[52] U.S. Cl. .................. 358/298; 358/534; 358/457
[58] Field of Search .................. 358/298, 75, 457

[56] References Cited

U.S. PATENT DOCUMENTS

| | | | |
|---|---|---|---|
| 4,080,634 | 3/1978 | Schreiber | 358/298 |
| 4,456,924 | 6/1984 | Rosenfeld | 358/75 |
| 4,491,875 | 6/1985 | Kawamura | 358/298 |
| 4,500,919 | 2/1985 | Schreiber | 358/78 |
| 4,837,613 | 6/1989 | Paxton et al. | 358/75 |

OTHER PUBLICATIONS

B. E. Bayer, "An Optimum Method for Two-Level Rendition of Continuous-Tone Pictures," (IEEE) International Conference on Communications, 1973, pp. 26-11 to 26-15.

Primary Examiner—B. R. Fuller
Assistant Examiner—Eric Frahm
Attorney, Agent, or Firm—Stuart P. Meyer; Amir H. Raubvogel

[57] ABSTRACT

A method and apparatus for color screening combines existing halftone pixel matrices into a super cell. Images of different intensities are displayed using such a super cell by selectively illuminating pixels in the super cell in an order that depends both on the illumination order of the original cells and a visitation order for the halftone cells that make up the super cell.

6 Claims, 6 Drawing Sheets

```
15 14 13 12
 4  3  2 11
 5  0  1 10
 6  7  8  9
```
4 x 4 HALFTONE CELL SHOWING ORDER OF ILLUMINATION (0 = FIRST)
*FIGURE 2a*
```
63 62 61 60 59 58 57 56
36 35 34 33 32 31 30 55
37 16 15 14 13 12 29 54
38 17  4  3  2 11 28 53
39 18  5  0  1 10 27 52
40 19  6  7  8  9 26 51
41 20 21 22 23 24 25 50
42 43 44 45 46 47 48 49
```
8 x 8 HALFTONE CELL SHOWING ORDER OF ILLUMINATION (0 = FIRST)
*FIGURE 2c*
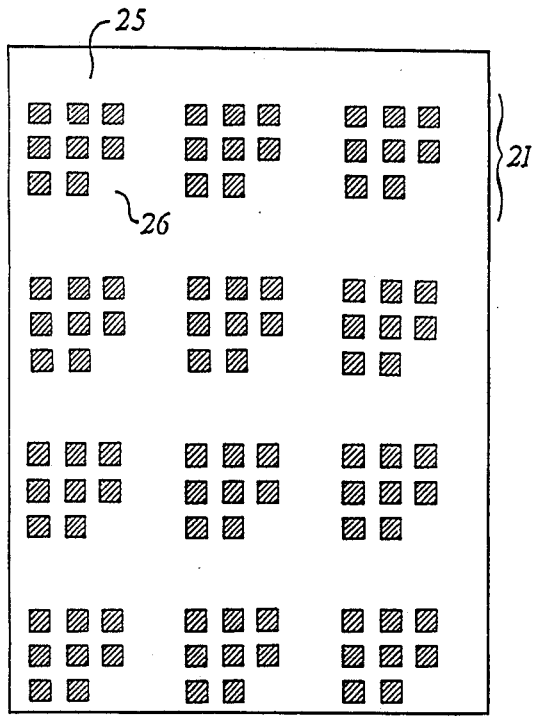
50% INTENSITY USING THE ABOVE 4 x 4 CELL
*FIGURE 2b*
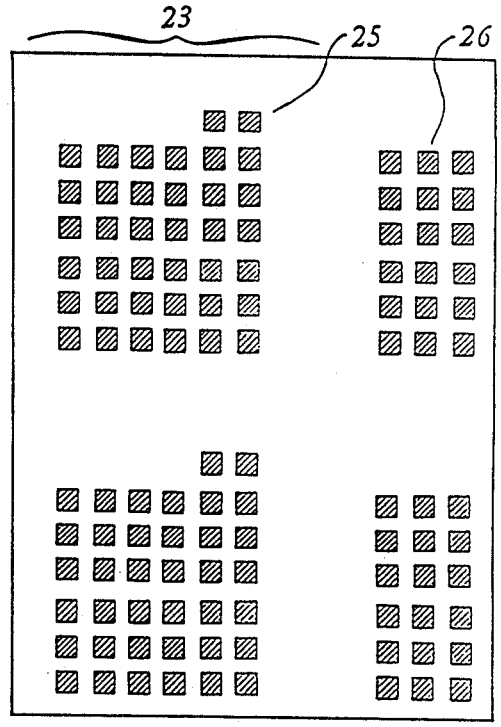
50% INTENSITY USING THE ABOVE 8 x 8 CELL
*FIGURE 2d*
*FIGURE 2 (PRIOR ART)*

```
15  7 17 20 28 18
 5  1  9 30 34 26   ─3
13  3 11 22 32 24
21 29 19 14  6 16
31 35 27  4  0  8
23 33 25 12  2 10
                    30
```

| | | | | | | | | | | | |
|---|---|---|---|---|---|---|---|---|---|---|---|
| 060 | 028 | 068 | 080 | 112 | 072 | 063 | 031 | 071 | 083 | 115 | 075 |
| 020 | 004 | 036 | 120 | 136 | 104 | 023 | 007 | 039 | 123 | 139 | 107 |
| 052 | 012 | 044 | 088 | 128 | 096 | 055 | 015 | 047 | 091 | 131 | 099 |
| 084 | 116 | 076 | 056 | 024 | 064 | 087 | 119 | 079 | 059 | 027 | 067 |
| 124 | 140 | 108 | 016 | 000 | 032 | 127 | 143 | 111 | 019 | 003 | 035 |
| 092 | 132 | 100 | 048 | 008 | 040 | 095 | 135 | 103 | 051 | 011 | 043 |
| 062 | 030 | 070 | 082 | 114 | 074 | 061 | 029 | 069 | 081 | 113 | 073 |
| 022 | 006 | 038 | 122 | 138 | 106 | 021 | 005 | 037 | 121 | 137 | 105 |
| 054 | 014 | 046 | 090 | 130 | 098 | 053 | 013 | 045 | 089 | 129 | 097 |
| 086 | 118 | 078 | 058 | 026 | 066 | 085 | 117 | 077 | 057 | 025 | 065 |
| 126 | 142 | 110 | 018 | 002 | 034 | 125 | 141 | 109 | 017 | 001 | 033 |
| 094 | 134 | 102 | 050 | 010 | 042 | 093 | 133 | 101 | 049 | 009 | 041 |

IMAGE DISPLAY APPARATUS AND METHOD USING HALFTONE SUPER CELLS

RELATED APPLICATIONS

This is a continuation of co-pending application Ser. No. 07/583,445 filed Sep. 17, 1990 abandoned.

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND FIELD OF THE INVENTION

This invention relates generally to the depiction of images on color display systems, and particularly to the use of halftone color screening to efficiently store and process images in computers for display on a monitor or printer.

Common color or monochrome graphics systems, such as laser printers or cathode ray tubes (CRTs) display images by marking pixels on a rectangular grid. Such systems may typically have a resolution of 300 pixels/inch in each direction. Many of these graphics systems employ binary pixels meaning they use only one bit of memory for each color of each pixel in order to save on memory. This means that for a typical color printer that can mark in three primary colors (e.g., cyan, magenta and yellow), each pixel can only be marked in one of 8 color combinations. In order to display the desired number of color gradations, a halftone or dithering technique is used. In this technique, a pattern of pixels (the "halftone cell pattern") is chosen such that the halftone cell can be replicated to cover the display area and that each pixel belongs to exactly one halftone cell. In a common technique the halftone cell pattern is a square of a given size, oriented at a given angle with respect to the bottom edge of the display.

As the color intensity of an image goes from low to high, pixels in the halftone cell are turned on in a fixed order. The order of illumination of the pixels can be illustrated by numbering the pixels from 0 to n−1 where n is the number of pixels in the halftone cell. A common order of illumination or "spot function" illuminates pixels in the order of increasing distance from the center of the halftone cell. This spot function gives a roughly circular peak of color centered in each cell, and is known as a single peak spot function.

Each shade of color displayable by a monitor or printer may thus be associated with its own set of primary color halftone cells, one for each primary color. Any number of sizes, orientations, or spot functions may be used to define halftone cells.

The prior art techniques for generating halftone images generally begin by the user selecting a color setting for the current component of the image. Images are always drawn as a sequence of components where each component is painted with a single fixed color setting. An example of a color component setting for a 3 color printer might be 50 percent cyan, 30 percent magenta, 10 percent yellow.

The second step is computing the halftone cell pattern for each primary color that is to be used in displaying the current component, and determining exactly which pixels in each halftone cell are to be turned on to result in a display with the desired shade and intensity. At this point there is a replicated pattern of halftone cells for each primary color, each with a fixed pattern of on and off pixels in the cell that approximates the desired intensity for that primary color. The size, shape, and angle of the halftone cell, and the spot function may be different for each primary color.

The final step is to paint the desired component of the image, using the superposition of the halftone cell patterns for each primary color to determine how to paint each pixel of the component. The color for each pixel of the image component is determined by combining the corresponding pixels of the replicated halftone cell patterns for each primary color. A pixel of the displayed image is painted with a given primary color if and only if the pixel was part of the image component and the pixel was turned on in the replicated halftone cell pattern for that primary color. Each pixel may be painted with any combination of the possible primary colors.

A well known problem with the prior art halftone cell approach described above is the tradeoff between the number of color intensities that can be represented and the resolution of detail in the image. For example, comparing a $8 \times 8$ halftone cell and a $4 \times 4$ halftone cell, both with single peak spot functions, the $8 \times 8$ cell will give 64 possible color intensities, and the $4 \times 4$ cell will give only 16 possible color intensities. However, the $4 \times 4$ cell will give much better perceived resolution of detail at medium intensities because the spots of color will be closer together. One prior art remedy to this problem is described in U.S. Pat. No. 4,837,613, where halftone cells are comprised of pixels which may themselves vary in intensity, thus requiring smaller halftone cell patterns to achieve the same range of color intensities. However, such a scheme the use of variable-intensity pixels instead of binary pixels requires additional memory to define the intensity with which each pixel is to be displayed.

SUMMARY OF THE INVENTION

In order to avoid the disadvantages of prior art halftoning schemes, the method and apparatus of the present invention uses an initial, predetermined halftone cell pattern and spot function as the basis for computing a new halftone cell pattern and spot function that offers resolution of detail very close to that of the original, but with additional gradations of color.

In accordance with the present invention, a group of existing adjacent halftone cells is selected to form a new halftone cell, or "super cell". If the original cells were each square, then the new halftone super cell is an $N \times N$ square group of the original cells.

A spot function is next derived for the super cell from the spot function for the original halftone cell. Thus, the "super cell" is itself comprised of the original, smaller halftone cells.

This method of defining the size and spot function of the new halftone cell is applied separately for each primary color used to form the display. The original halftone cells for each primary color may have different sizes, orientations, or spot functions, and therefore the new super cells derived for each color may be different as well.

As a result, the super cells provide increased gradation of color information for the displayed image without sacrificing apparent image resolution. The present invention operates in conventional display systems having binary pixels, so that there is not need for additional memory to define multiple intensity levels for each individual pixel comprising the displayed image.

DESCRIPTION OF THE DRAWINGS

FIGS. 2(a)–(d) illustrate examples of individual prior art halftone cells and how such cells may be used to yield an image of a given intensity. Specifically, FIG. 2a illustrates the order or illumination of a 4×4 halftone cell. FIG. 2b illustrates pixel illumination for an image of 50% intensity using halftone cells as shown in FIG. 2a. FIG. 2c illustrates the order of illumination of an 8×8 halftone cell. FIG. 2d illustrates pixel illumination for an image of 50% intensity using halftone cells as shown in FIG. 2c.

FIG. 5 illustrates one possible super cell spot function of the super cell of FIG. 4.

DETAILED DESCRIPTION OF THE DRAWINGS

Figure 1:
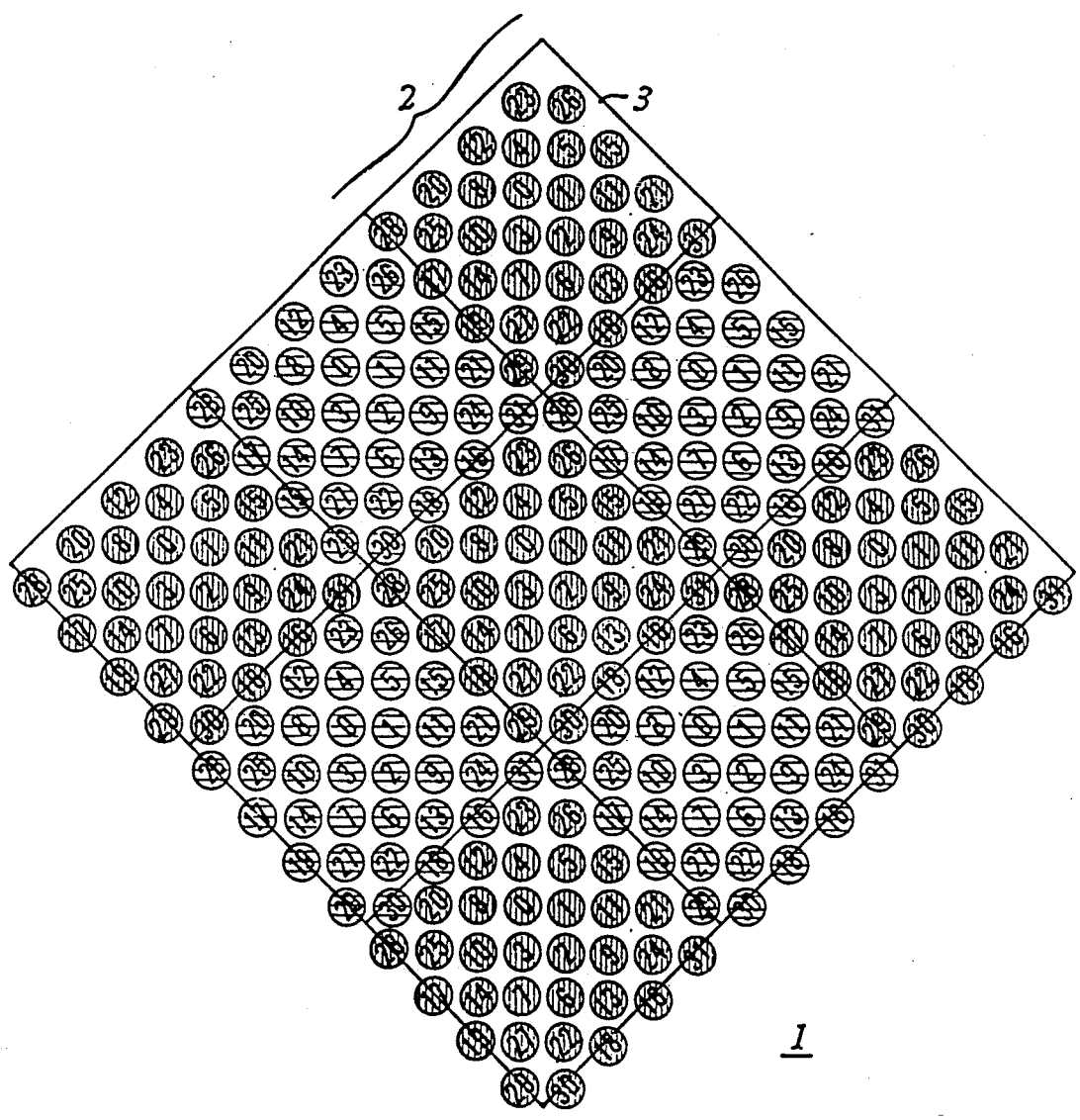
FIG. 1 illustrates a set of adjacent prior art halftone cells.

Referring now to FIG. 1, there is shown a cell set 1 comprised of nine original halftone cells 2. Each halftone cell 2 is in turn comprised of 32 pixels 3, numbered 0 through 31 in correspondence to the spot function of the individual halftone cells 2. The cell set 1 and individual halftone cells 2 of FIG. 1 are oriented at a 45 degree angle from the horizontal.

Referring now to FIGS. 2(a)–(d) two different prior art implementations are shown for a 50% intensity display. FIG. 2(a) illustrates a conventional 4×4 halftone cell 21 having 16 binary pixels 3 and a single peak spot function in which inner pixels (e.g., pixels numbered 0 through 3) are illuminated first as the intensity of the displayed image component increases. FIG. 2(b) illustrates a display portion 22 that results when a 50% intensity image component is displayed using these halftone cells. The display portion 22 is comprised of a number of halftone cells 21, each of which has some binary pixels illuminated 25 and some pixels not illuminated 26, in accordance with the single peak spot function for the individual halftone cells 21.

FIG. 2(c) illustrates a conventional 8×8 halftone cell 23 having 64 binary pixels 3 and a single peak spot function in which inner pixels (e.g., pixels numbered 0 through 15) are illuminated first as the intensity of the displayed image component increases. FIG. 2(d) illustrates a display portion 24 that results when a 50% intensity image component is displayed using these halftone cells. The display portion 24 is comprised of a number of halftone cells 23, each of which has some binary pixels illuminated 25 and some binary pixels not illuminated 26, in accordance with the single peak spot function for the individual halftone cells 23.

Figures 3, 4:
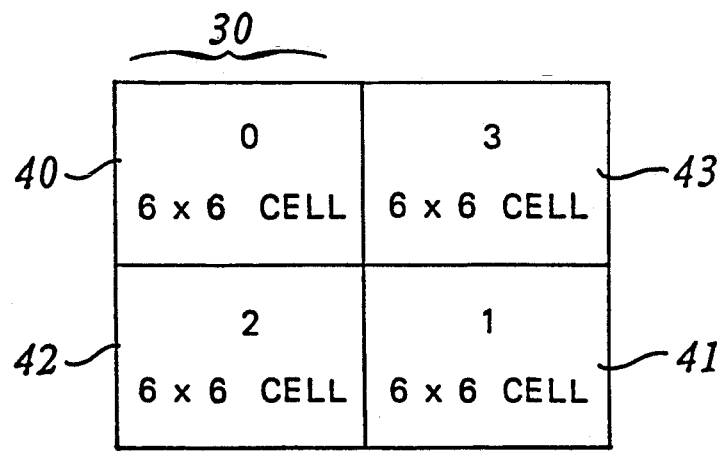
FIG. 3 illustrates a prior art 6×6 halftone cell having a given orientation and spot function, as may be incorporated into a super cell in accordance with the present invention.
FIG. 4 illustrates one possible arrangement of the halftone cells of the type illustrated in FIG. 3 into a new super cell in accordance with the present invention.

Referring now to FIG. 3, there is shown a conventional 6×6, zero degree orientation halftone cell 30 with a spot function in which binary pixels 3 generally in the top-left and bottom-right quadrants are illuminated first as the intensity of the displayed image component increases.

Referring now to FIG. 4, there is shown a super cell 45 in accordance with the present invention, comprising four conventional 6×6 halftone cells 30 of the type illustrated in FIG. 3. The super cell 45 shown in FIG. 4 has a zero degree orientation from the horizontal, although of course any orientation could be used in accordance with the present invention. FIG. 4 further illustrates the order in which binary pixels in these cells 30 are illuminated as the intensity of the displayed image component increases. As illustrated, the order of visitation for super cell 45 is as follows: A pixel in the upper left hand cell 40 is illuminated first, then a pixel in lower right hand cell 41, then one in lower left hand cell 42 and finally one in upper right hand cell 43. The overall spot function for the entire super cell 45 of this implementation may be described mathematically as:

$$s(k) = f(i)*C + v(j) \qquad \text{Eq. 1}$$

where:

f(i) is the spot function defining the order of illumination of pixels for the original halftone cells, C is the number of halftone cells in the super cell, v(j) is the order of visitation of the halftone cells comprising the super cell, and where pixel k of the new halftone cell is pixel i of halftone cell j. If N is the number of pixels in each original halftone cell, then values for k will range from 0 to N*C −1.

The value of s(k) therefore indicates the order in which the kth pixel will be illuminated as the intensity of the display increases. FIG. 5 illustrates the order of illumination for the super cell illustrated in FIG. 4, which in turn is comprised of halftone cells of the type illustrated in FIG. 3.

Figure 6:
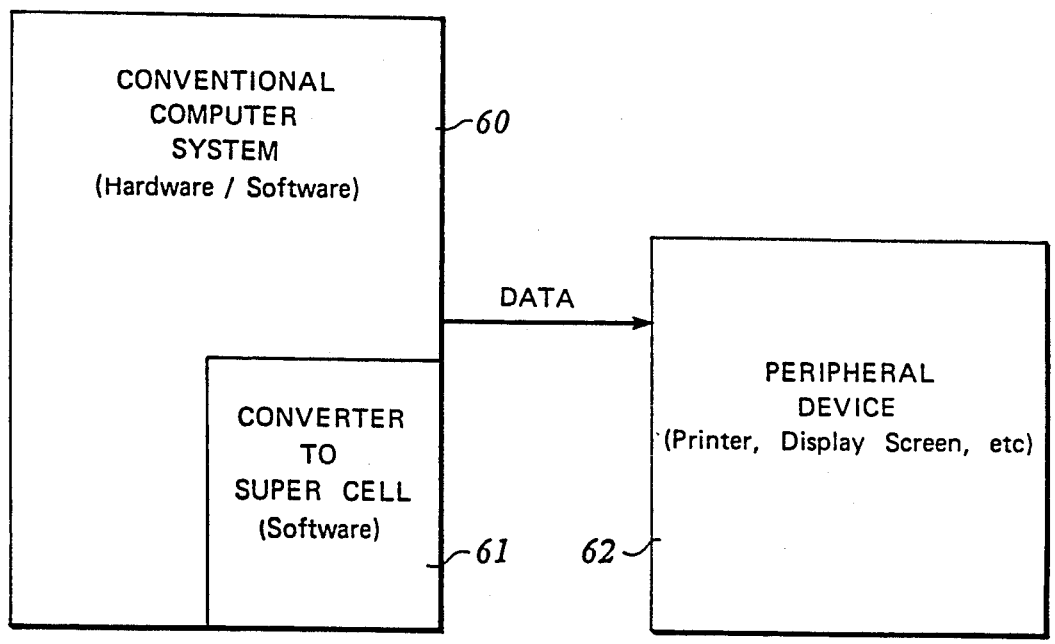
FIG. 6 illustrates one embodiment of apparatus in accordance with the present invention.

Referring now to FIG. 6, one embodiment of the present invention is a conventional personal computer system 60 including a computer software converter 61 written in the C programming language to convert conventional halftone cell description data into super cell description data in accordance with the present invention. The super cell descriptions created by converter 61 are loaded in the conventional manner to memory (not shown) in the peripheral device 62 and thereafter become the default halftone screening descriptions of the peripheral device 62. The preferred embodiment specifies such description data as a table to operate under the "POSTSCRIPT" computer graphics standard. In accordance with the present invention, image data is processed in the conventional manner via a POSTSCRIPT interpreter program in the computer or attached peripheral device, loaded with the data table produced by the converter 62. Alternatively, the converter could be incorporated directly into a POSTSCRIPT interpreter program. Either way, conventional means such as look-up tables or computer language statements may be used to implement the super cell converter of the present invention.

Figure 7:
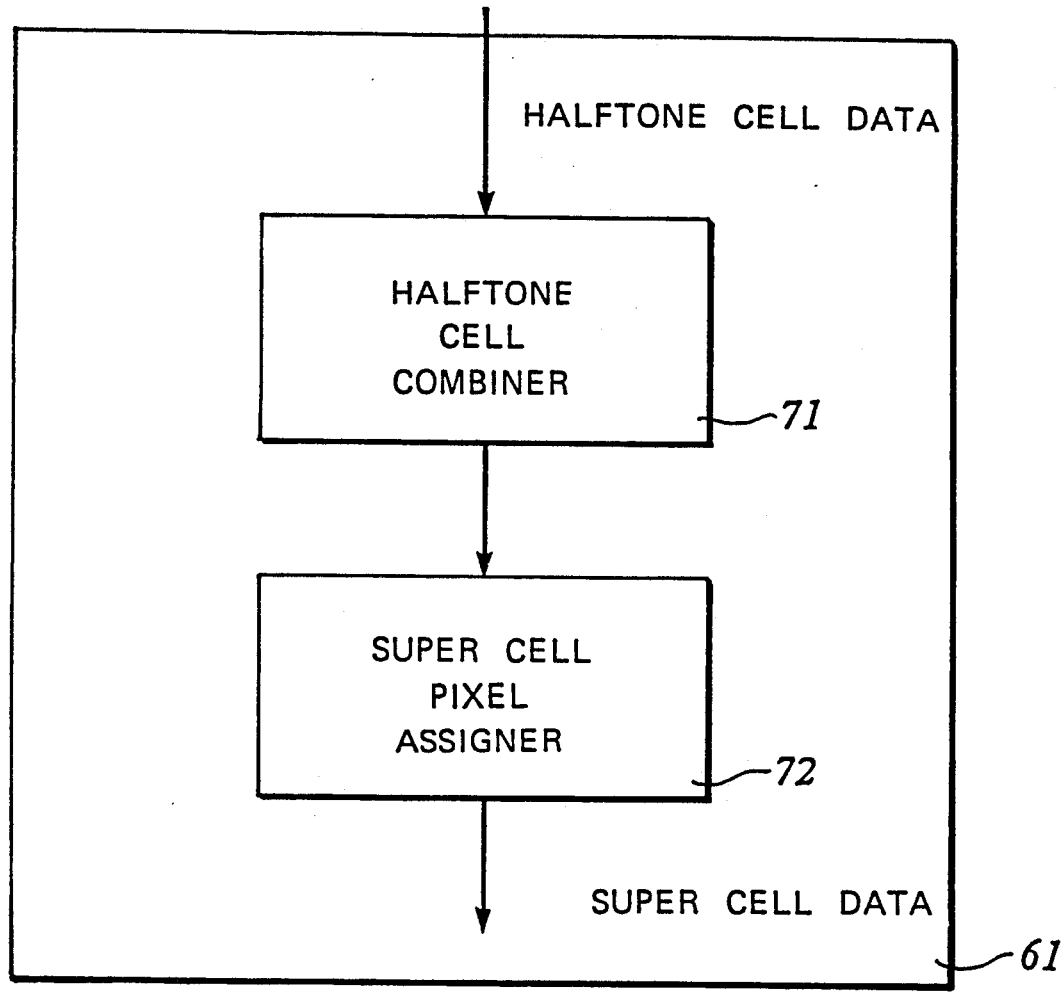
FIG. 7 illustrates in greater detail the converter illustrated in FIG. 6.

Referring now to FIG. 7, there is illustrated in greater detail the software converter 61 of FIG. 6. The input to the converter is halftone cell description data, which is combined in module 71 into groups of adjacent cells as previously described. Assigner module 72 then assigns super cell spot function values to the pixels from the joined group of cells, thereby completing the conversion of the original halftone cell description data into super cell description data.

As an additional disclosure, the source code for an embodiment of the invention is included below as an appendix. It should be noted that terminology in the source code may differ slightly from that in the remainder of the specification. Any differences in terminology, however, will be easily understood by one skilled in the art.

Thus, the combination of halftone cells into a super cell provides an increased range of color intensity without sacrificing image resolution, and is operable in a conventional display system having binary pixels, without requiring additional memory.

APPENDIX

```
#define CSCREEN12
#define TWIN6
#define MAKE12
#define ALLSAME
define MULT 1 ifdef CSCREEN12
define SIZE 12
int cyan[SIZE][SIZE] = {
        15,  7, 17, 20, 28, 18,  0,  0,  0,  0,  0,  0,
         5,  1,  9, 30, 34, 26,  0,  0,  0,  0,  0,  0,
        13,  3, 11, 22, 32, 24,  0,  0,  0,  0,  0,  0,
        21, 29, 19, 14,  6, 16,  0,  0,  0,  0,  0,  0,
        31, 35, 27,  4,  0,  8,  0,  0,  0,  0,  0,  0,
        23, 33, 25, 12,  2, 10,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0
} ;
int magenta[SIZE][SIZE];

int yellow[SIZE][SIZE];

int black[SIZE][SIZE];

endif ifdef CSCREEN12A
define SIZE 12
int cyan[SIZE][SIZE] = {
        17,  7,  6,  0,  0,  0,  0,  0,  0,  0,  0,  0,
         9,  4,  5,  0,  0,  0,  0,  0,  0,  0,  0,  0,
        15, 11, 13,  0,  0,  0,  0,  0,  0,  0,  0,  0,
         0,  0,  0, 16,  3,  2,  0,  0,  0,  0,  0,  0,
         0,  0,  0,  8,  0,  1,  0,  0,  0,  0,  0,  0,
         0,  0,  0, 14, 10, 12,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0
} ;
int magenta[SIZE][SIZE];

int yellow[SIZE][SIZE];

int black[SIZE][SIZE];

endif
```

```c
#ifdef CSCREEN12B
#define SIZE 12
int cyan[SIZE][SIZE] = {
        15,  7, 17, 20, 28, 18,  0,  0,  0,  0,  0,  0,
         5,  1,  9, 30, 34, 26,  0,  0,  0,  0,  0,  0,
        13,  3, 11, 22, 32, 24,  0,  0,  0,  0,  0,  0,
        21, 29, 19, 14,  6, 16,  0,  0,  0,  0,  0,  0,
        31, 35, 27,  4,  0,  8,  0,  0,  0,  0,  0,  0,
        23, 33, 25, 12,  2, 10,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0,
         0,  0,  0,  0,  0,  0,  0,  0,  0,  0,  0,  0
} ;
int magenta[SIZE][SIZE];

int yellow[SIZE][SIZE];

int black[SIZE][SIZE];

endif void pra(colr, s)
char *colr;
int s[][SIZE];
{
        int i, j;

printf("/%s [\n", colr);
        for(i = 0; i < SIZE; i++) {
                for(j = 0; j < SIZE; j++) {
                        if(SIZE > 10)
                                printf(".%03i ", s[i][j]*MULT);
                        else
                                printf(".%02i ", s[i][j]);
                }
                printf("\n");
        }
        printf("] def\n");
} main()
{
        int i, j, sum;

#ifdef TWIN6
        /* given a 6x6 that is half filled in (only 0..17),
           generate the other half (18..35) */
        for(i = 0; i < 3; i++) {
                for(j = 3; j < 6; j++) {
                        cyan[i][j] = 35-cyan[i][j-3];
                }
        }
        for(i = 3; i < 6; i++) {
                for(j = 0; j < 3; j++) {
                        cyan[i][j] = 35-cyan[i][j+3];
                }
        }
endif ifdef MAKE12
        /* form a 12x12 cyan screen from a 6x6 cyan */
        for(i = 0; i < SIZE/2; i++) {
```

```c
                for(j = 0; j < SIZE/2; j++) {
                        cyan[i][j] *= 4;
                }
        }
        for(i = 0; i < SIZE/2; i++) {
                for(j = 0; j < SIZE/2; j++) {
                        cyan[i+SIZE/2][j+SIZE/2] = cyan[i][j]+1;
                }
        }
        for(i = 0; i < SIZE/2; i++) {
                for(j = 0; j < SIZE/2; j++) {
                        cyan[i+SIZE/2][j] = cyan[i][j]+2;
                }
        }
        for(i = 0; i < SIZE/2; i++) {
                for(j = 0; j < SIZE/2; j++) {
                        cyan[i][j+SIZE/2] = cyan[i][j]+3;
                }
        }
endif ifdef MAKE12A
        /* form a 12x12 cyan screen from a 6x6 cyan */
        /* + ensure that 1st and 2nd 4 dots are adjacent */
        for(i = 0; i < SIZE/2; i++) {
                for(j = 0; j < SIZE/2; j++) {
                        if(cyan[i][j] >= 8)
                                cyan[i][j] *= 4;
                        else if(cyan[i][j] >= 4)
                                cyan[i][j] += 12;
                }
        }
        for(i = 0; i < SIZE/2; i++) {
                for(j = 0; j < SIZE/2; j++) {
                        if(cyan[i][j] >= 32)
                                cyan[i+SIZE/2][j+SIZE/2] = cyan[i][j]+1;
                        else
                                cyan[i+SIZE/2][j+SIZE/2] = cyan[i][j]+4;
                }
        }
        for(i = 0; i < SIZE/2; i++) {
                for(j = 0; j < SIZE/2; j++) {
                        if(cyan[i][j] >= 32)
                                cyan[i+SIZE/2][j] = cyan[i][j]+2;
                        else
                                cyan[i+SIZE/2][j] = cyan[i][j]+8;
                }
        }
        for(i = 0; i < SIZE/2; i++) {
                for(j = 0; j < SIZE/2; j++) {
                        if(cyan[i][j] >= 32)
                                cyan[i][j+SIZE/2] = cyan[i][j]+3;
                        else
                                cyan[i][j+SIZE/2] = cyan[i][j]+12;
                }
        }
endif sum = 0;
        for(i = 0; i < SIZE; i++) {
                for(j = 0; j < SIZE; j++) {
                        sum += cyan[i][j];
                }
        }
        printf("sum=%d expected=%d\n", sum, (SIZE*SIZE/2)*(SIZE*SIZE-1));
```

```
        sum = 0;
        for(i = 0; i < SIZE; i++) {
                for(j = 0; j < SIZE; j++) {
                        sum += magenta[i][j];
                }
        }
        printf("sum=%d expected=%d\n", sum, (SIZE*SIZE/2)*(SIZE*SIZE-1));

sum = 0;
        for(i = 0; i < SIZE; i++) {
                for(j = 0; j < SIZE; j++) {
                        sum += yellow[i][j];
                }
        }
        printf("sum=%d expected=%d\n", sum, (SIZE*SIZE/2)*(SIZE*SIZE-1));

sum = 0;
        for(i = 0; i < SIZE; i++) {
                for(j = 0; j < SIZE; j++) {
                        sum += black[i][j];
                }
        }
        printf("sum=%d expected=%d\n", sum, (SIZE*SIZE/2)*(SIZE*SIZE-1));

pra("cscr", cyan);
#ifndef ALLSAME
        pra("mscr", magenta);
        pra("yscr", yellow);
        pra("kscr", black);
#endif
}
```

What is claimed is:

1. A method of displaying images defined by illuminating binary pixels in an arrangement of halftone cells for each of a plurality of primary color components, each of said halftone cells having N binary pixels, comprising the steps of:

combining a plurality of adjacent said halftone cells into a halftone super cell for each of said plurality of primary color components;

selecting an overall order of illumination for said binary pixels in said super cell responsive to a first order of illumination for said binary pixels in each of said halftone cells and a second order of illumination for said halftone cells in said super cell; and illuminating said binary pixels responsive to said selected order.

2. A method as in claim 1, wherein said plurality of adjacent said halftone cells is a square number of halftone cells, and said super cell so formed is of square dimension.

3. A method as in claim 2, wherein said overall order of illumination follows a formula: $s(k)=f(i)*C+v(j)$, where:

$s(k)$ is the overall order of illumination,
$f(i)$ is the first order of illumination,
C is the square number,
$v(j)$ is the second order of illumination,
binary pixel k is a binary pixel of the super cell, binary pixel k also being representable as a binary pixel i of halftone cell j, and $0 \leq k < N*C$.

4. Apparatus for displaying images defined by illuminating binary pixels in an arrangement of halftone cells having N binary pixels, comprising:

means for combining a plurality of adjacent said halftone cells into a halftone super cell for each of said plurality of primary color components;

means for selecting an overall order of illumination for said binary pixels in said super cell responsive to a first order of illumination for said binary pixels in each said halftone cells and a second order of illumination for said halftone cells in said super cell; and means for illuminating said binary pixels responsive to said selected order.

5. Apparatus as in claim 4, wherein the means for illuminating said binary pixels comprises a raster-scan display.

6. Apparatus as in claim 4, wherein the means for illuminating said binary pixels comprises a printer.

* * * * *

UNITED STATES PATENT AND TRADEMARK OFFICE
CERTIFICATE OF CORRECTION

PATENT NO. : 5,287,195
DATED : February 15, 1994
INVENTOR(S) : Thomas P. Blumer

It is certified that error appears in the above-identified patent and that said Letters Patent is hereby corrected as shown below:

On the Title page, item [63]:

Please delete "Sep. 12, 1990" and insert --Sep. 17, 1990--.

Signed and Sealed this

Twenty-ninth Day of May, 2001

*Attest:*

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO.    : 5,287,195
DATED         : February 15, 1994
INVENTOR(S)   : Thomas P. Blumer It is certified that error appears in the above-identified patent and that said Letters Patent is hereby corrected as shown below:

<u>Title page,</u>
Item [73], Assignee, replace "Phoenix Technologies Ltd." with -- Oak Technology --

Signed and Sealed this

Twenty-sixth Day of November, 2002

Attest:

Attesting Officer

JAMES E. ROGAN
*Director of the United States Patent and Trademark Office*